United States Patent [19]

Brady et al.

[11] 4,209,599
[45] Jun. 24, 1980

[54] CONTINUOUS MASS PREPARATION OF POLYMERS

[75] Inventors: John W. Brady, Hoek van Holland; Pieter Eijsberg, Geleen; Johan D. Logemann, Hoek van Holland, all of Netherlands

[73] Assignee: Synres International B.V., Hoek van Holland, Netherlands

[21] Appl. No.: 870,230

[22] Filed: Jan. 13, 1978

[30] Foreign Application Priority Data

Jan. 15, 1977 [NL] Netherlands .................. 7700412

[51] Int. Cl.$^2$ .................... C08F 4/32; C08F 20/06
[52] U.S. Cl. ............................ 526/64; 526/65; 526/67; 526/68; 526/88; 526/317; 526/320
[58] Field of Search ............ 526/64, 65, 67, 317, 526/320, 348, 86, 88

[56] References Cited

U.S. PATENT DOCUMENTS

| | | | |
|---|---|---|---|
| 2,769,804 | 11/1956 | Hanson | 526/67 |
| 3,821,330 | 6/1974 | Free | 260/885 |
| 3,954,722 | 5/1976 | Echte et al. | 526/78 |

OTHER PUBLICATIONS

"Motionless Mixers Move Into New Processing roles," *Chemical Engineering*, May 9, 1977, pp. 95-96.
Design Bulletin, Static Mixer Modules—Technology—Processing—Sizing, Kenics Corp., 1976.

*Primary Examiner*—Edward J. Smith
*Attorney, Agent, or Firm*—Cushman, Darby & Cushman

[57] ABSTRACT

A process for the continuous mass polymerization of olefinically unsaturated monomers in the presence of a polymerization initiator. The polymerization is carried out in one or more tubular reactors provided with internal static mixing elements. A portion of the reaction mass produced in the reactor is recirculated back to the reactor as feed.

13 Claims, 2 Drawing Figures

CONTINUOUS MASS PREPARATION OF POLYMERS

BACKGROUND AND SUMMARY OF THE INVENTION

The invention relates to a process for the continuous mass polymerization of olefinically unsaturated monomers.

A process of this kind is particularly useful to produce polymers which are used as a solid, as for instance, as a molding material or as a powdered coating agent, or which are meant to be applied in the form of a solution or dispersion in a solvent which is not suitable as a medium for carrying out a solution polymerization or emulsion polymerization. Instead, these polymers are usually prepared by polymerization in an inert solvent which is subsequently evaporated.

Preparation by mass polymerization would be preferable, but batchwise mass polymerization in a stirred reactor is difficult to accomplish because of problems associated with the removal of the developed heat of polymerization and with the required stirring.

One proposed method to carry out a continuous mass polymerization is by passing the monomers and the required initiator, chain length regulator, and other additives through a long heated tube or by supplying them to an extruder after having been pre-polymerized to a syrup. It is difficult, however, to make a product of a constant quality and homogeneous composition using this method especially if a low monomer content in the product is desired.

In accordance with the present invention a polymer is prepared by heating, under polymerization conditions, a liquid mixture of one or more olefinically unsaturated, polymerizable compounds, at least one polymerization initiator and, if desired, other usual additives. The continuous mass polymerization is accomplished by continuously supplying to a tubular reactor one or more olefinically unsaturated monomers along with a polymerization initiator and, if desired, other commonly used additives. The tubular reactor is provided with internal static mixing elements. The reactor temperature, should range between the melting point of the polymer to be formed and about 300° C., with a pressure ranging between about 2 ats abs. and about 100 ats abs. Between about 50% and about 95% of the reaction mass leaving the tubular reactor is continuously returned as feed to said reactor while the remaining reaction mass is discharged as product. The reaction conditions are predetermined so that the discharged reaction mass has a conversion degree of at least about 75%.

The degree of conversion is understood to mean the percentage of monomer polymerized. If apart from the monomer only a small amount of other compounds is supplied to the reactor, the degree of conversion is almost equal to the weight percentage of polymer in the reaction mass.

Together with the elements required for recirculation of part of the reaction mass, the tubular reactor forms a circulating reactor.

A polymer prepared according to the present invention will contain about 25% or less, preferably less than about 15% of monomer, and is suitable for further processing. This further processing may be conducted after removal of the monomer by, for example, a treatment at elevated temperature and/or decreased pressure. Preferably, however, polymers having a low monomer content of at most about 5% of monomer and more particularly less than about 2% of monomer, are prepared by the process of the present invention. It is possible to prepare such a polymer in one circulating reactor by the process of the present invention. However, the degree of conversion in a first circulating reactor may be limited, for example, to between about 80% and about 90% with this product then fed continuously to a second circulating reactor which is designed and operated analogously to the first circulating reactor. The process with two circulating reactors is preferred since there are more possibilities in that case for variation of the process conditions.

The second circulating reactor is quite similar to the first and is comprised of a tube with internal static mixing elements. The reactor temperature should range between the melting point of the polymer to be formed and about 300° C. with a pressure ranging between about 2 and about 100 ats abs. Means are provided to continuously return about 50 to about 95% of the reaction mass leaving the tube again to the circulating system and to discharge the remaining portion. If desired, additional circulating reactors may be applied in series. The degree of conversion in the second or last reactor in the series is preferably at least about 95% and more particularly at least about 98%.

DETAILED DESCRIPTION OF THE INVENTION

The process of the present invention produces a homogeneous product with a constant composition and a low monomer content.

In the process of the present invention, both the recirculation of a portion of the reaction mass and the use of a static mixer in the reactor are essential. An important feature is that the relatively cold feed which contains monomer and initiator is rapidly mixed with the hot recirculated reaction mass. This makes it possible to use an initiator which is very active at the temperature prevailing in the reactor in order to achieve a high conversion with a short residence time. If initiator and monomer are heated slowly, as for example, in a simple tubular reactor, the initiator acts too soon and only a low conversion is reached. By using a recirculation of a portion of the reaction mass along with a static mixer, temperature peaks are avoided and a homogeneous product is obtained. A short residence time and good temperature control favor the preparation of polymers which have a tendency towards thermal degradation of linkage.

Another advantage of the present invention is that the equipment used in the process consists essentially of a tube with static mixing elements and a circulation pump, and is therefore low in capital cost. Concurrently, the energy consumption is low when compared with processes which use an extruder.

The volume of the whole system is relatively slight which means that a stable condition is reached soon after start-up and change-over from the production of one type of polymer to that of another type is easy.

The process of the present invention is very flexible. Besides, the obvious variations which can be made in temperature, supply of monomer and initiator, the quantity of recirculated reaction mass may be varied. Residence times can vary between about one minute and about three quarters of an hour, or even more.

Further, control of the polymerization is achievable by adding additional quantities of monomer and/or initiator or other additives to the circulating reactor in one or more intermediate places. If several circulating reactors arranged in series are being used, further control is achievable by also supplying monomer and/or initiator and/or other compounds to the second or subsequent circulating reactor. The equipment utilized in the process can be used over a broad range of viscosities, so that polymers of different molar weights can be prepared. The process can be carried out at an elevated pressure which allows for the use of relatively low-boiling monomers as feed.

Monomers used as feed in the process of the present invention are olefinically unsaturated polymerizable compounds which under the polymerization conditions employed are not or are only slightly volatile or liquid or soluble in the other components of the feed. Preferably, vinyl monomers are to be considered. Examples of suitable monomers which have no other reactive groups but the olefinic unsaturation are styrene, alpha-methylstyrene, vinyl toluene, esters of acrylic acid or methacrylic acid with alcohols containing 1–18 carbon atoms, like methylacrylate, ethylacrylate, butylacrylate, 2-ethylhexylacrylate, decylacrylate, methylmethacrylate, butylmethacrylate, ethyleneglycooldimethacrylate, and esters of other unsaturated mono- or dicarboxylic acids, such as diethylfumarate, diisobutylfumarate or di-n-butylmaleate.

If the polymerization is carried out at a strongly increased pressure, slightly lower-boiling monomers such as vinyl acetate and hexene-1 may also be considered.

Further, monomers containing reactive groups may be applied, provided that they be selected so that no undesirable reactions occur during the polymerization. Examples of such monomers are acrylic acid, methacrylic acid, crotonic acid, maleic acid anhydride, acrylamide, methylacrylamide, glycidyl-acrylate or -methacrylate, hydroxyethyl-acrylate and -methacrylate, hydroxypropyl-acrylate and -methacrylate, glycerolmonoailylether and the like.

Initiators commonly used in polymerization can be used in the present invention with preference given to peroxide compounds and azo compounds.

Examples thereof are tert. butylperbenzoate, di-tert-butyl-peroxide, benzoylperoxide, azobis-isobutyronitrile. The total quantity of inhibitor required may be added along with the monomer feed. However, a smaller quantity of initiator may be added to the feed with additional initiator then being added to the circulating reactor in an intermediate place and/or being added to a second or subsequent circulating reactor, if they are being used. Said intermediate place being situated between the monomer feed and the discharge of the reaction mass.

By using initiators with different triggering temperatures or different half-life periods, or by supplying the same initiator or different initiators in various places, optimum conversion can be achieved and the product properties can be varied. Introduction of initiator in various places may be favorable to proper temperature control, especially if highly active initiators are used.

As is usual in the polymerization of vinyl monomers, a chain length regulator may be added to the process of the present invention. The usual compounds may be used for this purpose. Examples are n-butylmercaptan, tert. amylmercaptan, n.octylmercaptan. Also slightly less active chain length regulators may be used such as diethylene glycol, triethylene glycol, 2.2.4.trimethylpentanediol 1.5,diethylene glycol monobutyl ether, and high-boiling aliphatic alcohols. These compounds, moreover, have a physical viscosity-lowering effect.

Further, other compounds may be added as long as they do not disturb the polymerization. Examples of such other compounds are plasticizers, stabilizers, pigments, polymers or compounds leading to cross-linking of the polymer at a temperature above the polymerization temperature. Also, a small amount of a high-boiling solvent such as butylglycolacetate may be added, particularly so if its presence in the end product has no disturbing effect.

Also reactive components may be added under the polymerization conditions, such as unsaturated higher fatty acids, alkyd resins, polyesters, polybutadiene or other polymers. These compounds are fully taken up by polymerization or act as graft polymer.

Further, it is also possible for a mixture of monomers already partly polymerized to be used as feed.

In the process of the present invention, reactors are used which are comprised of a tube with internal static mixing elements. These elements may consist of bars or sieve plates. Preferably, the reactor comprises a tube containing internal mixing elements which with as low as possible a flow resistance cause the reaction mass to be divided into several flows and recombined with change of the direction of flow. Examples of such static mixers are marketed by Kenics Corporation, USA, Sulzer Bros A.G., Switzerland, and Charles Ross and Son Co., U.S.A. By using these static mixers, the energy required for the circulation is relatively low while at the same time proper mixing and proper heat transfer is accomplished. These mixers can be supplied in different sizes.

Recirculation of part of the reaction mass and circulation by the static mixers may be carried out with a device suitable for transporting viscous materials, for instance, a gear pump or a screw pump. In most cases the entire amount of monomers, initiators, and additives can be added at the beginning of the circulating reactor either in the form of a pre-mixed flow via one feeding channel or as separate flows via several feeding channels. As described above, a portion of the monomers or of the initiator may also be supplied to the reactor in an intermediate place. Also, if two or more circulating reactors connected in series are used, all components may be supplied to the first reactor. In this embodiment, however, good results may also be achieved by adding one or more monomers or initiator to the second reactor or a subsequent reactor.

The temperature in the circulating reactor or reactors generally ranges between the melting point of the polymer to be formed and about 300° C. and is maintained by either cooling or heating the reactor tube. It is also possible for a certain temperature profile to be maintained over various zones of the reactor. Preferably, the temperature ranges between about 150° C. and about 225° C. If use is made of several circulating reactors connected in series, the temperature may vary in the several reactors.

Generally, the pressure in the circulating reactor or reactors ranges between about 2 and about 100 ats abs. and is dependent upon, inter alia, the type of static mixer, the circulation rate, and the temperature and the viscosity of the reaction mass. In most cases, the pressure ranges between about 5 and about 50 ats abs. If relatively volatile monomers or other additives are used, a pressure ranging between about 10 and about 75 ats abs. may be used.

The average residence time per circulating reactor, which is defined as the reactor volume divided by the volume of the feed supplied per unit of time, may be varied from between about 1 minute and about 45 or more minutes and is preferably between about 5 and about 20 minutes.

At a constant feed the amount of recirculated product can be changed by varying the circulation rate in the circulating system. In general, between 50% and 95% of the reaction mass discharged from the mixing tube can be recirculated. A smaller percentage will soon cause temperature peaks and a decrease in the effectiveness of the initiator. A larger percentage offers no essential advantage. Preferably, between 75% and 90% of the reaction mass is recirculated. If several circulating reactors are used in series, the recirculation ratio in each reactor can be set to a separate value.

DESCRIPTION OF THE DRAWINGS

The process of the present invention will be elucidated with the aid of FIG. 1.

Via line 1 and/or line 2 monomers, initiator and, possibly, further additives are continuously supplied to a tube 3 which is provided with internal static mixing elements. From this tube, the reaction mass flows via line 4 to a second tube 5 provided with internal static mixing elements. If required, also initiator or other compounds may be supplied, via line 6. Via line 7, the reaction mass flows to a pump 8, which, via line 9, forces the mass again to tube 3, where it is mixed with the fresh reactants. Part of the reaction mass is continuously drained from the circulating system via line 10 and passed to a second circulating system. The numbers 11 to 20 incl. indicate similar elements, having the same function, as do the FIGS. 1 to 10 incl. In this second circulating system however, the supply of fresh monomer and/or initiator via line 11 or 12 is optional. Via line 20 in which a control valve 21 is installed with the aid of which the system pressure can be set, the product continuously discharged from the second circulating system flows to a processing device 22. Here the product is cooled and processed to powder or flakes and discharged via line 23. If required, the product may, prior to the cooling, first pass a degasifying zone, in which low-molecualr components are removed.

Provisions for pre-mixing the reactants and giving them the required pressure, provisions for regulating the temperature, safety devices and measuring and control equipment have not been included in the Figure. If a single circulating system is applied, line 10 connects directly to control valve 21 and processing device 22.

Figure 1:
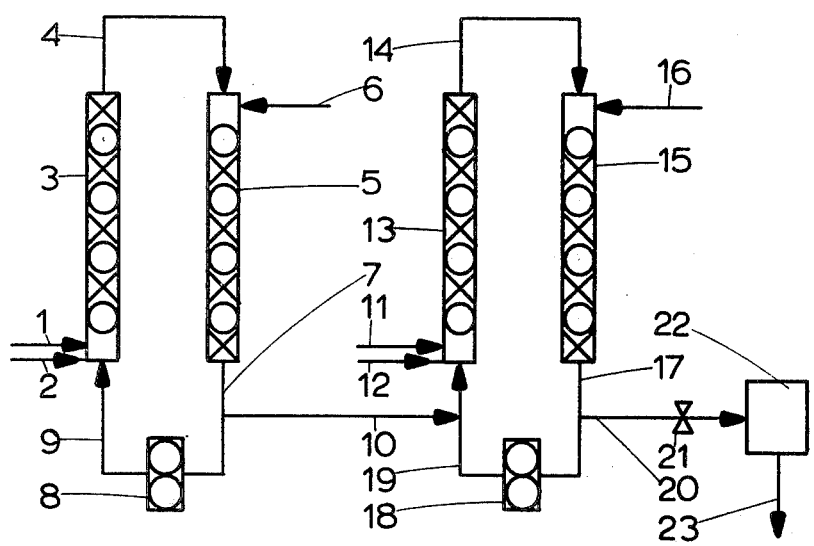

Of course, instead of two straight mixing tubes as shown in the drawing, one straight tube, several tubes or one bent tube may be used as the reactor. Also, several mixing tubes may be arranged in parallel in one circulating system. In the apparatus of FIG. 1, the major part of the polymerisation occurs in the first part of the first static mixer, since there is rapid mixing of the recycled reaction mass with the fresh monomers and catalyst so that the temperature quickly rises to a value above the temperature necessary to activate the catalyst. Thus the static mixer or the lower part of said mixer may be regarded as the primary reaction zone and the rest of this loop-reactor and the second loop-reactor may be regarded as secondary reaction zones or 'equalising' or 'finishing' zones.

Figure 2:
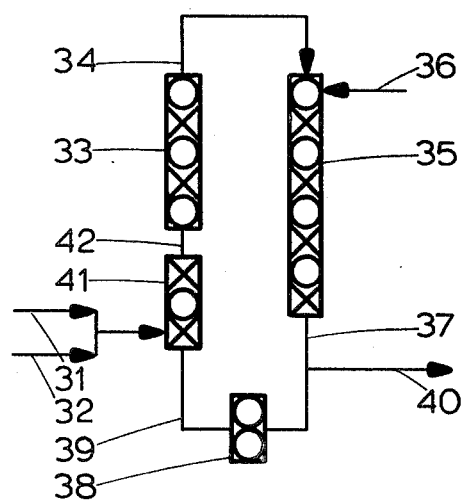

In a second embodiment of the invention, illustrated in FIG. 2, the primary reaction zone and the secondary reaction zone are physically separated. Referring to FIG. 2, the monomers and the catalyst are added through conduits 31 and 32, optionally via a mixing zone, to the primary reaction zone 41 which is provided with internal static mixing means. Recirculated reaction mass is introduced in 41 through pump 38 and conduit 39. Very rapid mixing occurs and the polymerisation is initiated with liberation of heat. From zone 41 the reaction mass is fed through conduit 42 to the secondary or finishing zone made up of reactor-zones 33 and 35 and connecting conduit 34. At least 40% and up to 70% of the monomers are polymerised in 41. The volume of said zone 41 may be small in comparison with the combined volume of 33 and 35, for example between 5% and 25% of said combined volume. The rest of the reaction system is similar to the system depicted in FIG. 1. The residence time of the reaction mass in the primary reaction zone is short and a considerable amount of heat is developed in this zone. Cooling of zone 41 thus has only a limited effect, and such cooling may be omitted. The secundary reaction zone is provided with external cooling. The temperature of the recirculated reaction mass is in both embodiments such that even after mixing with the relatively cold fresh feed the resulting temperature is higher than the activation temperature of the catalyst.

EXAMPLES

The process of the present invention will be elucidated with the aid of the following Examples, however, without being limited to the embodiments or products described therein.

The experiments described in the Examples were carried out in an arrangement as shown in FIG. 1. The tubes 3, 5 and 13, were stainless steel tubes having a length of, respectively 41.6 cm, 63 cm and 63 cm and an internal diameter of 11.3 mm, and all were provided with internal static mixing elements (Kenic static mixers, type 37-08-135, from Kenic Corporation, USA).

Tube 15 was a tube of 63 cm in length and a 10-mm internal diameter, without mixing elements. Pumps 8 and 18 were gear pumps with a variable delivery of between 10 and 50 liters/hour. The pressure which was set with the aid of control valve 21 is given in the Examples as system pressure. Owing to the resistance of the mixing elements the pressure measured at the end of tube 5 or tube 15 can be higher than the system pressure. The pressure difference over the first and second circulating systems is also given in the Examples.

Both circulating systems were cooled with oil, but the heat transfer was unintentionally limited.

The lowest temperatures were measured after pump 8 or 18, with the highest temperatures being at the end of tube 3 or tube 13.

The monomers, initiators, and part of the alcohols acting as chain-transferring- and viscosity-reducing-agents were supplied to the first circulating system via lines 1 and 2. Part of the alcohols was in all Examples supplied via the pressure safety devices in order to prevent them from becoming clogged.

The composition of the feed, expressed in weight percent, is given in the Table. In several Examples, part of the initiator was supplied to the second circulating system via line 11.

In all Examples, the degree of conversion after the first circulating system amounted to more than 80%.

The polymer formed was drained after the control valve, cooled on a metal plate, and ground.

The polymerization was started by first supplying a high-boiling alcohol and by slowly increasing the supply of monomer and initiator. After about one to two hours, a product of a constant composition was obtained. The polymerization was stopped by decreasing the supply of monomer and initiator and by adding a high-boiling alcohol.

| Mixture No. | 1 | 2 | 3 | 4 | 5 | 6 | 7 | 8 |
|---|---|---|---|---|---|---|---|---|
| Styrene | 32.9 | 31.5 | 30.3 | 31.5 | 33.1 | — | 25.8 | 47.2 |
| Methylmethacrylate | 12.9 | 15.1 | 14.5 | 15.1 | 16.3 | 86.0 | 20.5 | 16.1 |
| Methacrylic Acid | 18.1 | 26.1 | 25.1 | 26.1 | 24.3 | — | 29.9 | — |
| Ethylhexylacrylate | 24.6 | — | — | — | 11.1 | — | 13.2 | 6.3 |
| Hydroxyethylmethacrylate | — | — | — | — | — | — | — | 20.2 |
| Decylalcohol | — | 14.8 | 18.0 | 14.8 | — | — | — | — |
| Di-ethyleneglycol | — | — | — | — | — | 11.0 | 9.3 | 9.2 |
| Di-ethyleneglycolmonobutylether | 2.9 | — | — | — | 2.9 | — | — | — |
| Trimethylpentanediol | 7.6 | 11.0 | 10.6 | 11.0 | 10.0 | — | — | — |
| 1st circulating system initiator A | — | — | — | — | 0.1 | — | 0.3 | 0.4 |
| B | — | — | — | 1.5 | 1.7 | 2.8 | 0.8 | 0.5 |
| C | 0.7 | 1.5 | 1.5 | — | 0.4 | — | — | — |
| 2nd circulating system initiator A | — | — | — | — | — | — | — | — |
| B | — | — | — | — | — | — | — | — |
| C | 0.2 | — | — | — | — | 0.2 | 0.1 | 0.1 |

Initiator A is di-tert.butylperoxide
B is benzoylperoxide
C is tert.butylperbenzoate

EXAMPLE I 2984 cc of a mixture of monomers, alcohols and initiator was supplied per hour to the polymerization equipment described above. The composition of the mixture by weight is described in the Table under No. 1. The temperature in the circulating system ranged between 170° C. and 176° C. and in the second circulating system ranged between 178° C. and 180° C. The system pressure had been set to 9.5 ats abs. The pressure difference over the first circulating system amounted to approximately 9.5 ats abs. and over the second circulating system to approximately 10 ats abs. In both circulating systems the circulation rate amounted to 49.6 l/hour. The drained product was a colorless polymer having a melting point of 136° C., containing less than 0.9 weight percent of unsaturated monomer and 4 weight percent of trimethylpentanediol.

EXAMPLE II 3131 cc of the mixture described in the Table under No. 2 was supplied per hour. In the first circulating system the temperature ranged between 180° C. and 184° C. and in the second circulating system between 190° C. and 200° C. The system pressure had been set to 9.5 ats abs. In both circulating systems the pressure difference was less than 0.5 ats abs. and the circulation rate was 49.6 l/hour. The resulting, colorless polymer contained less than 1.3 weight percent of unsaturated monomer and approximately 23 weight percent of alcohols.

EXAMPLE III

The procedure of Example II was repeated, but with supply of 1567 cc/hour of the mixture described in the Table under No. 3 and at a system pressure of 10 ats abs. A colorless polymer was obtained which contained less than 1.2 weight percent of unsaturated monomer and about 24 weight percent of alcohols.

EXAMPLE IV 3134 cc per hour of the mixture described in the Table under No. 4 was supplied. The temperature in the first circulating system ranged between 156° C. and 174° C. and in the second circulating system ranged between 180° C. and 200° C. The system pressure had been set to 9.8 ats abs. The pressure difference over the first circulating system was 4 ats abs. and over the second circulating system less than 0.5 ats abs. In both circulating systems the circulating rate amounted to 12.85 l/hour.

The colorless polymer formed contained less than 1.0 weight percent of unsaturated monomer and approximately 22 weight percent of alcohols.

EXAMPLE V

The procedure of Example IV was repeated, but with a circulation rate in both circulating systems of 49.6 l/hour. The temperature in the first circulating system ranged between 159° C. and 170° C. and in the second circulating system between 188° C. and 200° C. The system pressure had been set to 10.5 ats abs. The pressure difference over the first circulating system was 14.5 ats abs. and over the second circulating system 3.5 ats abs.

The colorless polymer formed contained less than 2.0 weight percent of unsaturated monomer and approximately 24 weight percent of alcohols.

EXAMPLE VI 3007 cc per hour of the mixture described in the Table under No. 5 was supplied. The temperature in the first circulating system ranged between 170° C. and 175° C., and in the second circulating system was approximately 200° C. The system pressure had been set to 8 ats abs. In the first circulating system the pressure difference amounted to 22 ats abs. and in the second circulating system to 7 ats abs. In both circulating systems the circulating rate was 49.6 l/hour.

The colorless polymer formed contained less than 0.4 weight percent of unsaturated monomer and 4 weight percent of alcohols.

EXAMPLE VII 1425 cc per hour of the mixture described in the Table under No. 6 was supplied. The temperature in the first circulating system ranged between 154° C. and 163° C. and in the second circulating system between 196° C. and 200° C. The system pressure had been set to 11 ats abs. In the first circulating system the pressure difference was 23 ats abs. and in the second circulating system 1.5 ats abs. The circulation rate in the first circulating system was 35 l/hour and in the second circulating system 49.6 l/hour. The colorless polymer formed contained 4.1 weight percent of methylmethacrylate and 9 weight percent of dioxytol.

EXAMPLE VIII 3176 cc per hour of the mixture described in the Table under No. 7 was supplied. The temperature in the first circulating system ranged between 153° C. and 173° C. and in the second circulating system between 195° C. and 200° C. The system pressure had been set to 6 ats abs. The pressure difference in the first circulating system amounted to 14 ats abs. and in the second circulating system to 7 ats abs. The circulation rate amounted to 14 l/hour in the first circulating system and to 49.6 l/hour in the second circulating system.

The colorless polymer formed contained less than 1.2 weight percent of unsaturated monomer and 7 weight percent of dioxytol.

EXAMPLE IX 3047 cc per hour of the mixture described in the Table under No. 8 was supplied. The temperature in the first circulating system ranged between 157° C. and 165° C. and in the second circulating system was about 200° C. The system pressure had been set to 8 ats abs. The pressure difference amounted to 4 ats abs. in the first circulating system and to 4.5 ats abs. in the second circulating system. The circulation rate was 49.6 l/hour in both circulating systems. The colorless polymer formed contained less than 0.5 weight percent of unsaturated monomer and 8 weight percent of dioxytol.

The polymers obtained in the Examples I to VI are soluble in aqueous bases and could be used in floor wax. The polymethylmethacrylate obtained in Example VII could be used as molding material or coating material. The polymer obtained in the Examples VIII and IX could be applied as component in coating agents or ink, or as an additive in unsaturated polyesters.

Various modifications of the process of the present invention may be made without departing from the spirit or scope thereof and it should be understood that the invention is intended to be limited only as defined in the appended claims.

What is claimed is:

1. A continuous mass polymerization process for the polymerization of at least one olefinically unsaturated monomer in the presence of at least one polymerization initiator to effect a degree of conversion of at least about 75%, comprising the steps of:
    (A) Feeding to a tubular reactor which is provided with internal static mixing elements at least one olefinically unsaturated monomer and at least one polymerization initiator,
    (B) heating said monomer and said initiator to a predetermined temperature ranging between the melting point of the polymer to be formed and about 300° C. while maintaining the pressure of said tubular reactor between about 2 atmospheres absolute and about 100 atmospheres absolute, to form a reaction mass,
    (C) discharging from said tubular reactor said reaction mass formed in step B,
    (D) recirculating between about 50% by weight to about 95% by weight of said discharged reaction mass of step C back to said tubular reactor as feed, so that said monomer and initiator of step A and the recycled portion of the discharged reaction mass are brought in contact essentially in said reactor.

2. The process of claim 1 wherein between about 75% by weight and 90% by weight of the reaction mass formed in step B is recirculated in step D back to said tubular reactor as feed.

3. The process of claim 2 wherein the pressure of said tubular reactor is maintained between about 5 atmospheres absolute and about 50 atmospheres absolute.

4. The process of claim 3 wherein said monomer and said initiator are heated to a temperature ranging between about 150° C. and about 225° C.

5. The process of claim 4 wherein the degree of conversion is at least about 95%.

6. A continuous mass polymerization process for the polymerization of at least one olefinically unsaturated monomer in the presence of at least one polymerization initiator to effect a degree of conversion of at least about 75% in a plurality of tubular reactors provided with internal static mixing elements, said reactors being connected in series, comprising the steps of,
    (A) feeding to a first tubular reactor at least one olefinically unsaturated monomer and at least one polymerization initiator,
    (B) heating said monomer and said initiator to a predetermined temperature ranging between the melting point of the polymer to be formed and about 300° C. while maintaining the pressure of said first tubular reactor between about 2 atmospheres absolute and about 100 atmospheres absolute, to form a reaction mass,
    (C) discharging from said first tubular reactor said reaction mass formed in step B,
    (D) recirculating between about 50% by weight to about 95% by weight of said discharged reaction mass back to said first tubular reactor as feed, so that said monomer and initiator of step (A) and the recycled portion of the discharged reaction mass are brought in contact essentially in said first tubular reactor,
    (E) feeding between about 5% by weight and about 50% by weight of said discharge reaction mass to a second tubular reactor connected in series with said first tubular reactor, said second tubular reactor being maintained at a temperature between the melting point of the polymer to be formed and about 300° C. and at a pressure between about 2 atmospheres absolute and about 100 atmospheres absolute,
    (F) discharging the reaction mass from said second tubular reactor,
    (G) recirculating between about 50% by weight and about 95% by weight of the discharged reaction mass of step F back to said second tubular reactor as feed.

7. The process of claim 6 wherein an additional quantity of said monomer and/or initiator is fed to said second tubular reactor, and wherein said additional quantity of said monomer and/or initiator is brought into contact with said recycled portion of step (G) essentially in said second tubular reactor.

8. The process of claim 7 wherein the degree of conversion of the reaction mass discharged from the second reactor is at least about 95%.

9. The process of claim 6 including the additional step of,
    (H) feeding from between about 5% by weight to about 50% by weight of the reaction mass discharged from said second tubular reactor to one or more tubular reactors connected in series, said reactors being maintained at a temperature between the melting point of the polymer to be formed and about 300° C. and a pressure of between about 2 atmospheres absolute and about 100 atmospheres absolute, wherein between about 50% by weight to about 95% by weight of the reaction mass discharged from each of said tubular reactors is fed to the next tubular reactor in series, and between about 5% by weight and 50% by weight of said discharged reaction mass is recirculated back to the reactor from which it was discharged, as feed.

10. The process of claim 6 wherein additional quantities of said monomer and/or said polymerization initiator are fed to one or more of the tubular reactors connected in series and wherein said additional quantities of said monomer and/or said initiator are brought into contact with recycled portions of said discharged reaction masses essentially in the reactors.

11. The process of claim 10 wherein the degree of conversion of the reaction mass discharged from the last reactor is at least about 95%.

12. A continuous mass polymerization process for the polymerization of at least one olefinically unsaturated monomer in the presence of at least one polymerization initiator to effect a degree of conversion of at least 75%, comprising the steps of (A) Feeding to a primary tubular reactor which is provided with internal static mixing elements at least one monomer and at least one initiator, the pressure of said reactor being maintained between about 2 atmospheres absolute and 100 atmospheres absolute and the temperature ranging between the melting point of the polymer to be formed and 300° C. and being such that polymerization of at least part of the monomer(s) occurs in this primary reactor, (B) passing the reaction mass formed in said primary reactor to a secondary tubular reactor provided with internal static mixing elements, in which reactor the temperature ranges between the melting point of the polymer to be formed and 300° C. and the pressure is maintained between 2 and 100 atmospheres absolute, in which secondary reactor the reaction continues, (C) discharging from said secondary reactor the reaction mass formed in step B, (D) recirculating between about 50% by weight to about 95% by weight of said discharged reaction mass back to the primary reactor, so that said monomer and initiator of step (A) at the recycled portion of the discharged reaction mass are brought into contact essentially in said primary tubular reactor, (E) taking the remainder of the reaction mass from the circulating reactor formed by the primary and secondary reactor and the associated means for recirculation.

13. The process according to claim 12, wherein said remainder of step (E) is fed to a tubular-reactor provided with internal static mixing elements, and (a) heating said remainder to a predetermined temperature ranging between the melting point of the polymer to be formed and about 300° C. while maintaining the pressure of said tubular reactor between about 2 atmospheres absolute and about 100 atmospheres absolute, to form a second reaction mass, (b) discharging said second reaction mass from said tubular reactor, (c) recirculating between about 50% by weight to about 95% by weight of said discharged second reaction mass back to said tubular reactor.

* * * * *